United States Patent [19]

Miller et al.

[11] Patent Number: 5,014,945

[45] Date of Patent: May 14, 1991

[54] WEDGIE

[76] Inventors: Larry D. Miller, 7735 Frederick Rd., Hyattsville, Md. 20784; Michael A. Billingsley, 6410 Old Landover Rd., Landover, Md. 20735

[21] Appl. No.: 486,203

[22] Filed: Feb. 28, 1990

[51] Int. Cl.$^5$ ............................................. F16M 11/00
[52] U.S. Cl. ................................. 248/188.4; 248/650; 248/677; 248/688
[58] Field of Search .................... 248/188.4, 687, 688, 248/650, 677, 188.8, 188.9, 649

[56] References Cited

U.S. PATENT DOCUMENTS

| 155,635 | 10/1874 | Brotherton | 248/188.4 |
| 1,355,429 | 10/1920 | Sabins et al. | 248/188.4 |
| 1,417,639 | 5/1922 | Sterner | 248/188.4 |
| 3,565,399 | 2/1971 | Kelly | 248/188.4 |
| 3,653,341 | 4/1972 | Nielsen | 248/188.4 |
| 3,814,363 | 6/1974 | Brelosky | 248/188.4 |
| 3,841,663 | 10/1974 | Proffit | 248/188.4 |
| 4,721,275 | 1/1988 | Benton et al. | 248/687 X |

FOREIGN PATENT DOCUMENTS

| 2372 | of 1910 | United Kingdom | 248/188.4 |
| 891875 | 3/1962 | United Kingdom | 244/188.4 |

Primary Examiner—David L. Talbott
Attorney, Agent, or Firm—Robert Halper

[57] ABSTRACT

A leveling device for stabilizing furniture positioned adjacent a wall and resting on carpeting comprising an insert in the form of a plate with a nose forming an angle having a jack embedded in the vertical nose of the angle. The jack comprises U-shaped legs that puncture carpeting and padding and rest on the floor.

6 Claims, 1 Drawing Sheet

U.S. Patent  May 14, 1991  5,014,945
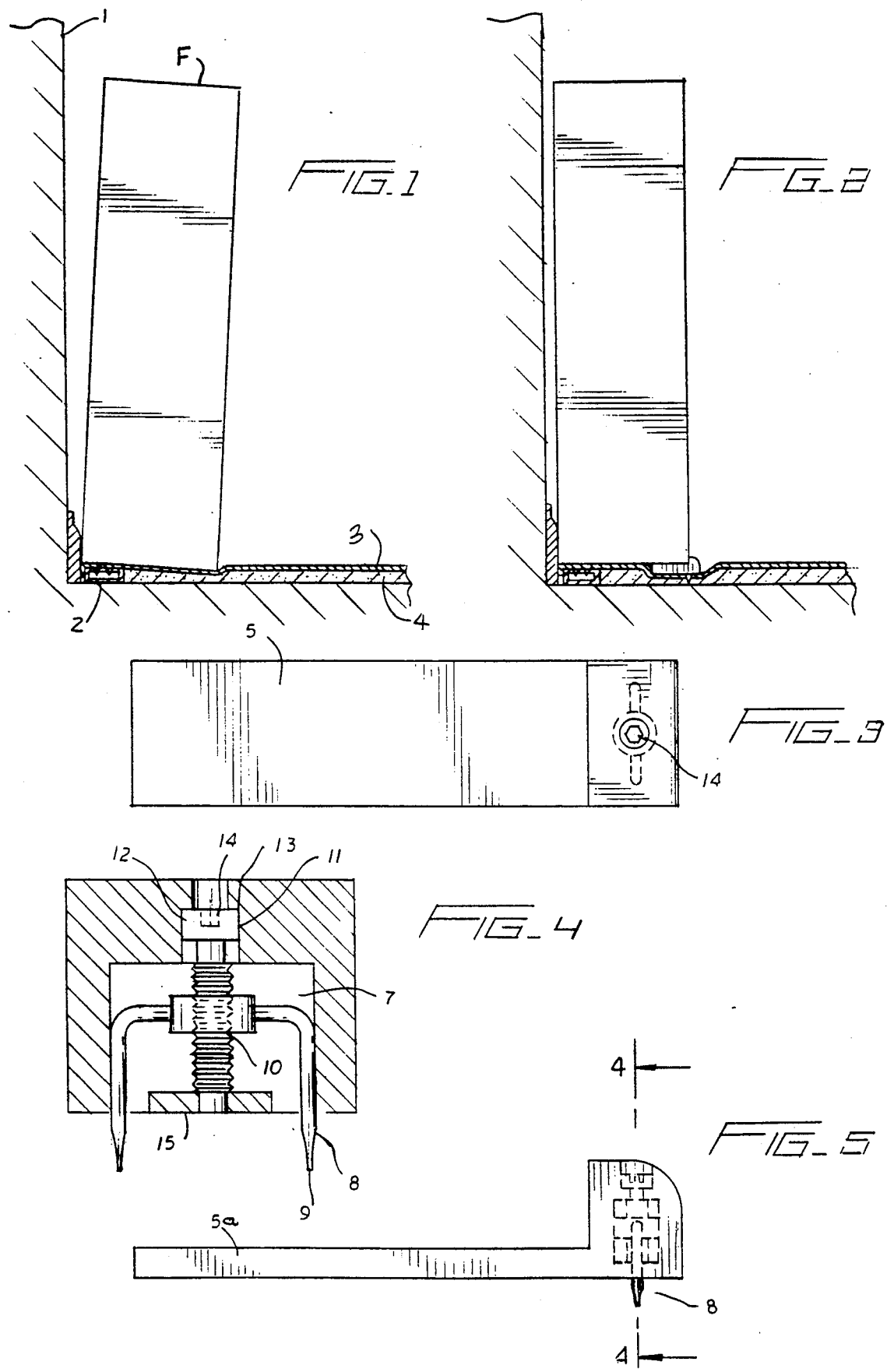

WEDGIE

INTRODUCTION

This invention has to do with a leveling device for use in a household having various type fixtures such as shelves, china hutches, entertainment centers, or any fixture of considerable height with a base stand as opposed to legs or wheels. The leveling device is particularly adapted to a situation wherein wall to wall carpeting is employed. Often to conserve space it is requisite to position the furniture as close as possible to the wall. Under such circumstances an unstable condition is likely to prevail which tends to result in wobbling or teetering, and likely to create a dangerous situation for members of the household. This result is due to the fact that adjacent the wall where one end of the furniture is located a tack strip for the carpeting is inserted which tends to elevate the furniture rear. At the same time extending outwardly from the location of the tack strip is a layer of carpet padding underlying the carpet. The heavier furniture pieces exert a downward force which can not be contained by the soft padding causing the furniture to dip downwardly from its position at the wall above the tack strip. To correct this situation a leveling device is inserted at the front of the furniture between the carpet surface and the support structure for the furniture. The specific device of this invention is in the form of a jack which is readily adaptable to solve the problem of instability.

Leveling devices are of course not new. Exemplary of the art are U.S. Pat. Nos. 1,057,785, 2,250,155, 2,747,826, 3,021,638, 3,452,663, 4,114,845, 4,830,230. None of these devices however is directed to the problem of stabilizing furniture positioned on wall to wall carpeting. Furthermore the jacks or the wedges of these patents are structurally dissimilar.

SUMMARY OF THE INVENTION

It is an object of the disclosed invention to provide a new device for use with furniture as described above to prevent wobbling and teetering and thereby preventing accidents and risk to household members.

It is another object of this invention to provide a simple user friendly device which can be adapted by home owners or the like to stabilize furniture.

It is further an object of this invention to use a leveling device which is modest in price ace can be quickly positioned by insertion of the same between the furniture and a support surface.

For a further understanding of the objects of this invention reference is made to the following detailed description of the preferred embodiment and the accompanying drawings.

BRIEF DESCRIPTION OF THE DRAWINGS

FIG. 1 is a side view showing the article of furniture in a condition without the leveling device.

FIG. 2 is a side view showing the same article with the leveling device.

FIG. 3 is a bottom view showing the leveling device assembly.

FIG. 4 is an end view of the device showing a slot in the angle leg.

FIG. 5 is a side view showing the leveling device per se.

DETAILED DECRIPTION OF THE DRAWINGS

With reference to FIG. 1 an article of furniture F is shown with its one end adjacent a wall 1 and supported by a tack strip 2. The furniture extending outwardly from the one end rests on a carpet 3 overlying a soft padding 4. As is shown in the absence of the stabilizing device the furniture is inclined downwardly from its one end to the other end creating an unstable condition that could cause wobbling or teetering. FIG. 2 shows correction of this condition by inserting a leveling device or devices beneath the furniture and upon the carpet support surface. With reference to FIG. 3 there is shown a leveling device assembly 5 constructed in the shape of a plate with a nose, the whole forming an angle 5, which can be made of steel, iron, aluminum or a combination thereof. The plate is about five inches in length, one and a half inches wide and a quarter inch thick and the vertical nose of the angle is one inch high. This nose contains a narrow rectangular slot 7 extending from the bottom of the nose to about a quarter inch from the top of the nose. Located within this slot is an inverted U-shaped member 8 having tapered ends 9 with flatted points which are sharp enough to penetrate the carpet and padding but unable to pierce the flooring beneath. Centrally located in the U-shaped member is a threaded block 10 which accommodates a bolt 11. The bolt has a cap 12 which fits in an opending 13 in the center of the vertical nose of the angle. Above the cap the opening narrows and continues to the top of the vertical nose. The cap has a shaped recess 14 into which an Allen wrench can be fitted. The bolt extends thru the slot in the center of the vertical nose thru the block and to a web 15 of the angle which acts as a retaining strip.

In operation once it is determined that the article of furniture is arranged in the above described manner so that the rear rests against the wall and on a tack strip and the front end rests on the carpet, depending on the size of the article, several inserts can be placed beneath the furniture on the carpet. The inserts will already have U-shaped members located therein so that all that is necessary to stabilize the furniture is to place an Allen wrench through the opening in the angle nose and turn the bolt whereupon the U-shaped members will penetrate the carpet and padding and be rigid on the floor surface. Further turning of the bolt will elevate the angle and consequently the furniture front. While a carpenter's level could be used to achieve very accurate leveling, in most cases the eye is all that is necessary. Stability can be ascertained by simply gripping the furniture and determining if there is any teetering taking place. The leveling device, including the inserts, are readily detachable from between the front end of the furniture and carpeting by merely manipulating the adjusting bolt of the jack.

We claim:

1. A leveling device for use with an article of furniture said furniture having a rear end and a front end and a horizontal surface said rear end placed adjacent a vertical wall and said horizontal surface at said end placed over flooring having a tack strip that engages said rear end said furniture extending from said wall being placed on carpeting overlying a soft padding surface engaging the flooring a plurality of inserts placed along said front end at spaced intervals between said furniture and said carpeting said inserts comprising plates having flat portions and vertical noses said vertical noses extending outwardly of said plates and adjacent said furniture said inserts having jacks embedded in said vertical noses to elevate said front end of said furniture to such extent that will place the furniture in a rigid stable postion, where in said jack comprises an inverted U-shaped pin having ends shaped to enable penetration of said carpeting and padding but not said flooring, said inserts being readily detechable from between furnitue and said rug by adjustment of the jack.

2. A leveling device as recited in claim 1 wherein said inserts are made of steel, iron, aluminum or combination of the same.

3. A leveling device as in claim 1 wherein said pin comprises a centrally located threaded block section and an adjusting bolt located therein said bolt having a flat end bottom portion that is retained on a web of said vertical nose.

4. A leveling device as in claim 3 wherein said adjusting bolt has a cap portion with a recess shaped to accommodate an allen wrench.

5. A leveling device as in claim 3 wherein said pin is fitted in a rectangular slot in said vertical nose.

6. A leveling device for stabilizing an article of furniture inclined from its rear end to its front end comprising a flat plate portion placed between a support surface such as a carpet over flooring and the support structure of said article of furniture said leveling device including a vertical nose portion extending upwardly from said plate portion and adjacent said article of furniture said nose portion having a rectangular slot and a web portion therein over said carpet a jack in said slot comprising an adjusting bolt having a flat bottom end portion resting on said web and a cap portion fitted into a bore at the center of said nose said bolt extending through a threaded block of an inverted U-shaped pin located in said slot said pin having downwardly extending legs tapering to flattened ends sharp enough to penetrate said carpeting but not said flooring said cap having an axial recess shaped to accommodate an allen wrench, said leveling device being readily detachable from between said furniture and said carpet by manipulation of said adjusting bolt, said leveling device being placed at spaced intervals along said front end of said furniture.

* * * * *